US009115032B2

(12) United States Patent
Seabaugh et al.

(10) Patent No.: US 9,115,032 B2
(45) Date of Patent: Aug. 25, 2015

(54) SINTERING AIDS FOR LANTHANIDE CERAMICS

(75) Inventors: Matthew M. Seabaugh, Columbus, OH (US); Scott Lawrence Swartz, Columbus, OH (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 64 days.

(21) Appl. No.: 13/702,282

(22) PCT Filed: Feb. 23, 2012

(86) PCT No.: PCT/US2012/026334
§ 371 (c)(1),
(2), (4) Date: Dec. 27, 2013

(87) PCT Pub. No.: WO2012/116188
PCT Pub. Date: Aug. 30, 2012

(65) Prior Publication Data
US 2014/0106957 A1    Apr. 17, 2014

Related U.S. Application Data

(60) Provisional application No. 61/446,493, filed on Feb. 24, 2011.

(51) Int. Cl.
*C04B 35/00* (2006.01)
*C04B 35/50* (2006.01)
(Continued)

(52) U.S. Cl.
CPC ............... *C04B 35/50* (2013.01); *B22F 1/0085* (2013.01); *C04B 35/42* (2013.01); *C04B 35/64* (2013.01);
(Continued)

(58) Field of Classification Search
CPC ............... C04B 2235/3217; C04B 2235/3225; C04B 35/505; C04B 35/12; C04B 35/42; C04B 35/50
USPC .......................................... 501/126, 132, 152
See application file for complete search history.

(56) References Cited

U.S. PATENT DOCUMENTS 4,013,592 A * 3/1977 Matsuoka et al. ......... 252/519.1
4,128,776 A   12/1978 Boquist et al.
(Continued)

OTHER PUBLICATIONS

International Search Report dated Aug. 3, 2012 from corresponding PCT/US2012/026334, 6 pages.
Zhu, et al.; "Development of Interconnect Materials for Solid Oxide Fuel Cells"; Materials Science and Engineering A348, Apr. 23, 2002, pp. 227-243.
International Preliminary Report on Patentability (IPRP) dated Mar. 28, 2013 from corresponding PCT/US2012/026334, pp. 9.

*Primary Examiner* — Noah Wiese
(74) *Attorney, Agent, or Firm* — Ralph J. Mancini

(57) ABSTRACT

This disclosure relates to a method of densifying a lanthanide chromite ceramic or a mixture containing a lanthanide chromite ceramic. The method comprises mixing one or more lanthanide chromite ceramics with one or more sintering aids, and sintering the mixture. The one or more lanthanide chromite ceramics are represented by the formula $(Ln_{1-x}AE_x)_z Cr_{1-y}B_yO_{3-\delta}$, wherein Ln is a lanthanide element or yttrium, AE is one or more alkaline earth elements, B is one or more transition metals, x is a value less than 1, y is a value less than or equal to 0.5, and z is a value from 0.8 to 1.2. The sintering aids comprise one or more spinel oxides. The one or more spinel oxides are represented by the formula $AB_2O_4$ or $A_2BO_4$ wherein A and B are cationic materials having an affinity for B-site occupancy in a lanthanide chromite ceramic structure, e.g., $ZnMn_2O_4$, $MgMn_2O_4$, $MnMn_2O_4$ and $CoMn_2O_4$. This disclosure also relates in part to products, e.g., dense ceramic structures produced by the above method.

26 Claims, 15 Drawing Sheets

(51) Int. Cl.
  *C04B 35/42* (2006.01)
  *C04B 35/64* (2006.01)
  *B22F 1/00* (2006.01)

(52) U.S. Cl.
  CPC . *C04B 2235/3205* (2013.01); *C04B 2235/3206* (2013.01); *C04B 2235/3213* (2013.01); *C04B 2235/3224* (2013.01); *C04B 2235/3225* (2013.01); *C04B 2235/3227* (2013.01); *C04B 2235/3239* (2013.01); *C04B 2235/3244* (2013.01); *C04B 2235/3262* (2013.01); *C04B 2235/3263* (2013.01); *C04B 2235/3268* (2013.01); *C04B 2235/3275* (2013.01); *C04B 2235/3284* (2013.01); *C04B 2235/443* (2013.01); *C04B 2235/449* (2013.01); *C04B 2235/5409* (2013.01); *C04B 2235/6562* (2013.01); *C04B 2235/6565* (2013.01); *C04B 2235/6567* (2013.01); *C04B 2235/77* (2013.01); *C04B 2235/80* (2013.01)

(56) References Cited

U.S. PATENT DOCUMENTS

| | | | |
|---|---|---|---|
| 4,292,209 A | | 9/1981 | Marchant et al. |
| 4,631,238 A | * | 12/1986 | Ruka .............................. 429/442 |
| 4,749,632 A | * | 6/1988 | Flandermeyer et al. ...... 429/468 |
| 4,866,013 A | * | 9/1989 | Anseau et al. ................ 501/96.5 |
| 5,143,751 A | | 9/1992 | Richards et al. |
| 5,169,811 A | * | 12/1992 | Cipollini et al. .............. 501/117 |
| 5,171,646 A | | 12/1992 | Rohr |
| 5,185,301 A | | 2/1993 | Li et al. |
| 5,286,686 A | * | 2/1994 | Haig et al. .................... 501/117 |
| 5,298,469 A | | 3/1994 | Haig et al. |
| 5,342,705 A | * | 8/1994 | Minh et al. .................... 429/479 |
| 5,356,730 A | | 10/1994 | Minh et al. |
| 5,707,911 A | * | 1/1998 | Rakhimov et al. ............ 501/128 |
| 5,864,576 A | | 1/1999 | Nakatani et al. |
| 2008/0006532 A1 | | 1/2008 | Mukundan et al. |
| 2010/0193104 A1 | | 8/2010 | Ryu et al. |

* cited by examiner

SINTERING AIDS FOR LANTHANIDE CERAMICS

TECHNICAL FIELD

This present disclosure relates to dense lanthanide chromite ceramic materials, and more particularly, to methods of densifying a lanthanide chromite ceramic or a dual phase mixture containing a lanthanide chromite ceramic and ionically conducting ceramic. This present disclosure also relates to products or components made by the disclosed methods.

BACKGROUND

Lanthanide chromite ceramics generally comprise the family of compositions $Ln_{1-x}AE_xCr_{1-y}B_yO_{3-\delta}$, where Ln is a lanthanide element or yttrium, AE is an alkaline earth element, B is one or more transition metals, $x<1$ and $y\leq 0.5$) are technologically significant because they, among the lanthanide perovskite materials, maintain the greatest stability of crystal structure over oxygen partial pressures between 1 and $10^{-16}$ atmospheres. Over this range of oxygen partial pressures, the Cr cations do not change valence, which makes the crystal structure stable against the formation of oxygen vacancies and the concomitant increase in thermal expansion coefficient ("CTE").

Intrinsic conductivity in the fundamental $LaCrO_3$ structure is p-type (the primary charge carrier being electron holes) electronic conduction, which increases with temperature and the oxygen partial pressure. Extrinsic conductivity of $LaCrO_3$ is increased by the addition of A-site alkaline earth dopants, which is compensated for on the B-site by Cr adopting 4+ valence in direct proportion to the alkaline earth doping concentration. This increases the number of electron hole charge carriers and the overall conductivity of the material in oxidizing and mildly reducing conditions. At strongly reducing conditions ($P_{O2}<10^{-8}$ atm), these doping strategies significantly increase the number of oxygen vacancies in the crystal structures. These doping strategies also increase the thermal expansion of the structure, an effect which is exacerbated at low $P_{O2}$ by the increasing oxygen vacancy concentration.

The stability of lanthanum chromite materials makes them critical materials for components in electrochemical systems in which membranes are required to provide gas-tight, electrically conductive separation of oxidizing and reducing environments. Particular applications of interest include solid oxide fuel cells ("SOFCs"), where the ceramics provide the electrical interconnect between the anode and cathode layers of adjacent SOFCs in an SOFC stack. In electrochemical membrane systems, these materials can provide a similar interconnection function. Lanthanum chromite materials also can provide the electronic conduction path for composite mixed conducting (a two-phase mixture of oxygen and electronic conducting ceramic materials) membranes.

Additional applications of lanthanum chromite materials include their use as catalysts (combustion reactions for hydrocarbons and methane reforming), as well as anode materials for SOFC applications. These materials are also among those considered for sensors and other electrochemically driven devices.

For many of these applications, the lanthanum chromite material must be sintered to form a dense membrane. The sintering of $LaCrO_3$ based ceramics is a notoriously difficult process. This obstacle alone has resulted in the failure of many SOFC programs to achieve manufacturability, as densification of the chromite requires sintering above 1600° C. to achieve targeted density values in the chemically pure material. Sr-(LSC) and Ca-(LCC) doping of the structure reduces the sintering temperature over the phase-pure $LaCrO_3$ considerably, while raising its CTE. However, this approach still requires extremely high sintering temperatures to achieve dense parts.

The poor sinterability of the perovskite lanthanum chromite has been attributed to the formation of a volatile species, mainly $CrO_3$, which then condenses as $Cr_2O_3$ at interparticle necks and prohibits the further densification. In order to suppress the $CrO_3$ volatilization the materials were sintered at low $pO_2$. Sintering can be improved by using a chromium deficient composition along with Sr or Ca doping. These dopants can react with chromium to form a liquid phase which aids sintering. Liquid formation is attributed to the melting of chromate species, $SrCrO_4$ or $CaCrO_4$, which exsolute from the perovskite. During sintering the chromate phases melt, enhancing densification, and then go back into solid solution in the perovskite, serving as a transient liquid phase sintering aid. The presence of the second phases acts to suppress the vaporization of the chromium component in LSC or LCC.

A range of processing approaches has been investigated in an attempt to overcome these obstacles. These approaches included the evaluation of $SrVO_4$, $SrCrO_4$ and $CaCrO_4$ liquid phase formers, which create transient liquid phases during sintering. Sintering temperatures could be reduced to temperatures in the range of 1500-1600° C. The chromate liquid phases were studied within the concept of a transient liquid phase formation generated by A-site excess, which led to significant compromises in the resultant ceramic stability during atmospheric exposure to water. The parts effectively crumbled.

Additions of transition metals (Co, Cu, Ni, Fe, Mn, or V) to Sr-doped lanthanum chromite ("LSC"), particularly V, has been noted to reduce the sintering temperature needed for densification of lanthanum chromites. For example, a 5% addition of V to the B-site of the structure allowed densification of the material at 1500° C.

It has also been determined that ZnO additions to Sr-doped lanthanum chromite could reduce the sintering temperatures of the material. However, loss of ZnO at high temperatures (T>1550° C.) ultimately resulted in A-site excess, liquid phase formation and exaggerated grain growth.

Sr, Mn-doped lanthanum chromite ("LSCM"), which has been investigated for SOFC anode purposes, could provide adequate stability and performance as a ceramic interconnect material. This material offers a path to reduced processing temperatures compared to Sr-doped lanthanum chromite. For example, $(La_{0.75}Sr_{0.25})_{0.95}(Cr_{0.5}Mn_{0.5})O_3$ was co-sintered with zirconia and ceria interlayers at temperatures of 1500-1550° C.

There is a need for alternate methods for reducing the sintering temperature necessary for densification of lanthanide chromite ceramics that overcome the problems encountered with the prior art methods.

SUMMARY OF THE INVENTION

The present invention may be characterized as a method of densifying a lanthanide chromite ceramic, said method comprising: (i) mixing the lanthanide chromite ceramic with sintering aids, the sintering aids comprising one or more spinel oxides; and (ii) sintering the mixture at a sintering temperature from about 1100° C. to about 1500° C., preferably in an air atmosphere.

Alternatively, the present method may be characterized as a method of densifying a multi-phase conducting ceramic mixture containing a lanthanide chromite ceramic and one or more ionically conducting ceramics said method comprising: (i) mixing the lanthanide chromite ceramic, the ionically conducting ceramics, and sintering aids, the sintering aids comprising one or more spinel oxides, and (ii) sintering the mixture at a sintering temperature from about 1100° C. to about 1500° C., preferably in an air atmosphere.

The present invention may also be characterized as a dense lanthanide chromite ceramic composition comprising a lanthanide chromite ceramic represented by the formula $(Ln_{1-x}AE_x)_zCr_{1-y}B_yO_{3-\delta}$, wherein Ln is a lanthanide element or yttrium, AE is one or more alkaline earth elements, B is one or more transition metals, x is a value less than 1, y is a value less than or equal to 0.5, and z is a value from 0.8 to 1.2; and a sintering aid comprising one or more spinel oxides, and wherein the density of the ceramic composition is enhanced by sintering the composition at a sintering temperature from about 1100° C. to about 1500° C., preferably in an air atmosphere.

Another characterization of the present invention is a dense, multi-phase ceramic composition comprising: (a) a lanthanide chromite ceramic represented by the formula $(Ln_{1-x}AE_x)_zCr_{1-y}B_yO_{3-\delta}$, wherein Ln is a lanthanide element or yttrium, AE is one or more alkaline earth elements, B is one or more transition metals, x is a value less than 1, y is a value less than or equal to 0.5, and z is a value from 0.8 to 1.2; (b) one or more ionically conducting ceramics; and (c) a sintering aid comprising one or more spinel oxides, and wherein the density of the ceramic composition is enhanced by sintering the composition at a sintering temperature from about 1100° C. to about 1500° C., preferably in an air atmosphere.

Finally, the invention may also be characterized as a product, such as components used in a solid oxide fuel cell (SOFC), an electrochemical membrane system, an electrochemical sensor, or catalyst/component for use in combustion reactions for hydrocarbons and methane reforming.

The preferred sintering aids comprise one or more spinel oxides represented by the formula: $AB_2O_4$ or $A_2BO_4$, where A and B are cationic materials, such as $ZnMn_2O_4$, $MgMn_2O_4$, $MnMn_2O_4$ and $CoMn_2O_4$.

DETAILED DESCRIPTION

Figure 1:
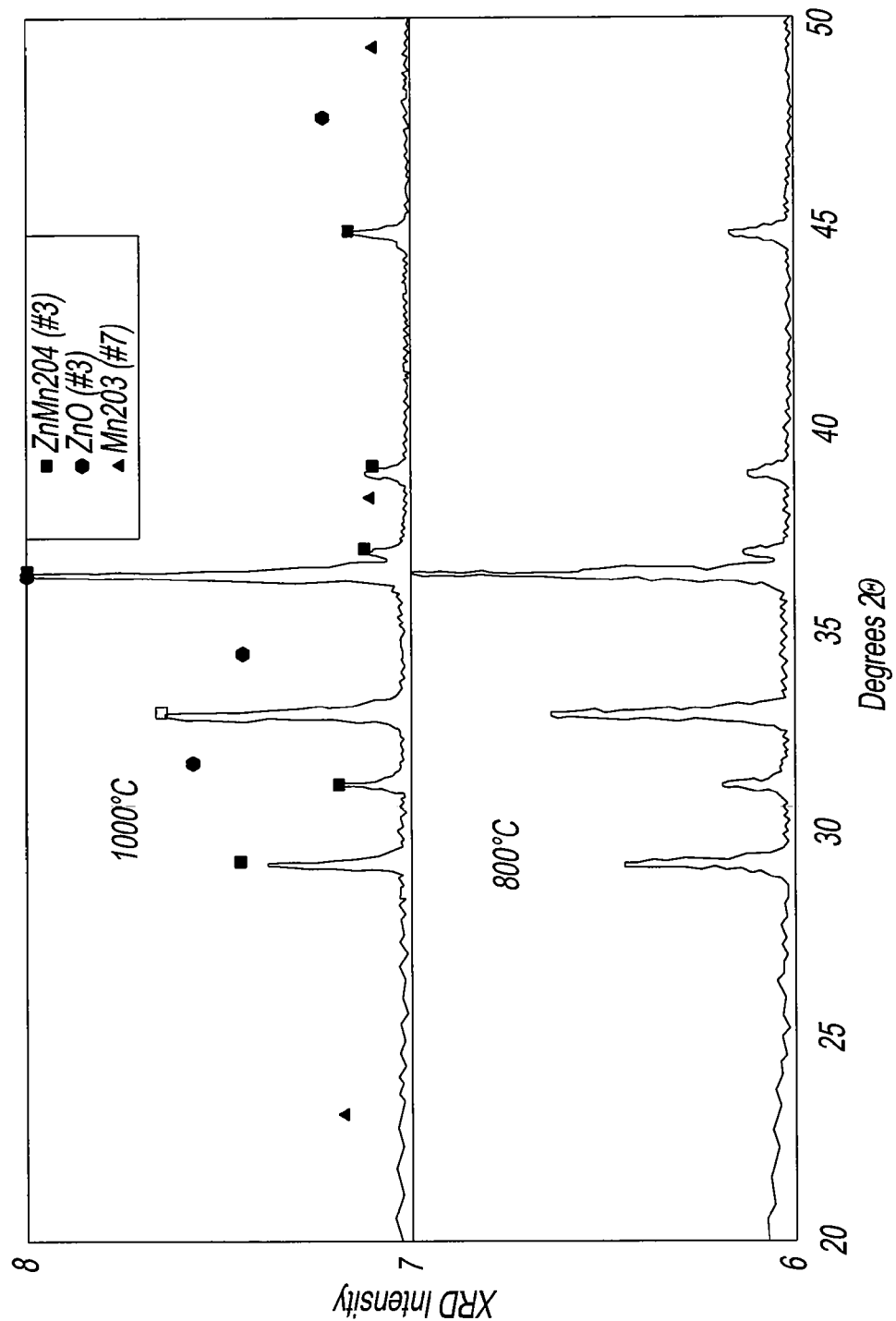
FIG. 1 is a x-ray diffraction analysis of zinc manganite ($ZnMn_2O_4$) processed at 800° C. and 1000° C. in accordance with Example 1.

In accordance with this disclosure, enhanced sintering performance is provided for lanthanum chromite-based ceramics, preferably in air atmospheres. The process proceeds at moderate processing temperatures, in contrast to additions of ZnO. In contrast to other lower temperature air sintering solutions which use a liquid phase, the proposed sintering aids are believed to densify principally by solid-state reaction mechanisms.

By eliminating or minimizing the need for reducing atmospheres, required for some competing solutions, the sintering method of this disclosure greatly reduces the cost and complexity of the process equipment required to produce gas-tight coatings or dense ceramic bodies. By eliminating or minimizing liquid phase formers from the lanthanum chromite-based ceramic material, it is believed that the materials will enjoy better stability at high operating temperatures, where liquid phase formers are suspected to coalesce and coarsen with time, leading to strength-limiting defects.

Advantageously, the sintering method of this disclosure has no reliance on controlled sintering atmospheres, which significantly reduces capital requirements. In contrast to prior art approaches which utilize vanadium-based sintering aids, the proposed technology offers a variety of materials that present less of a health concern, reducing environmental/health/safety precautions and costs.

Illustrative lanthanide chromite ceramics useful in this disclosure include one or more ceramics of the formula: $(Ln_{1-x}AE_x)_zCr_{1-y}B_yO_{3-\delta}$, wherein Ln is a lanthanide element or yttrium, AE is one or more alkaline earth elements, B is one or more transition metals, x<1, y≤0.5, and z=0.8 to 1.2. In other versions, 0≤x<0.5, or 0<x<0.2. In still other versions, Ln is lanthanum and AE is strontium. And in still other versions B comprises $B'_{y-n}B''_n$, wherein B' and B" are transition metals and n is <0.5. In one particular example, B comprises $B'_{y-n}B''_n$, wherein B' is Mn, B" is V, and n is <0.1. While the sintering aids described herein may be used with any lanthanide chromite ceramic, including those described above, one specific example is (La,Sr)(Mn,Cr,V)$O_{3-\delta}$, such as $(La_{0.825}Sr_{0.175})_{0.95}Cr_{0.72}Mn_{0.26}V_{0.02}O_{3-\delta}$.

The lanthanide chromite ceramic material may be present in the mixture in an amount from about 50 to about 99.9 volume percent, wherein the amount of lanthanide chromite ceramic material is measured as a volume percent of the combined volume of ceramic(s) and sintering aid(s) prior to sintering. In another example, the lanthanide chromite ceramic material is present in an amount of from 80 to 99.9 volume percent, or between 95 and 99.9 volume percent.

One or more spinel oxide based sintering aids may be added to the lanthanide chromite ceramic(s) in any of a variety of ways prior to sintering, such as simple mixing. In one example, from 0.1 to 50 volume percent sintering aid may be added, wherein the amount of sintering aid is measured as a volume percent of the combined volume of ceramic(s) and sintering aid(s) prior to sintering. In another example, sintering aid(s) is added between 0.1 to 20 volume percent, or between 0.1 and 5 volume percent. After mixing, the mixture is sintered at a temperature lower than that necessary for densification of the ceramic(s) if the sintering aid were not present. In some examples, the addition of the spinel oxide based sintering aid(s) results in densities greater than 90 percent of theoretical at sintering temperatures less than 1500° C. In addition, in some versions, the addition of the sintering aid(s) also improves the conductivity of the resulting product.

A embodiment for practicing this disclosure is to add the spinel oxide based sintering aid as a finely divided powder mixed in with the lanthanum chromite powder. The composite powder is formed and sintered in air to produce a single-phase perovskite material.

As further described herein, one or more sintering aids may be added to lanthanide chromite-based ceramics to aid in densification at reduced temperatures. For example, in some embodiments, the sintering aids described herein allow for 90% or greater densification at sintering temperatures less than 1500° C. In some versions, the sintering aids are compositions which do not present (or require) A-site ions (such as La, Sr or other alkaline earth elements) to be added to the system. The addition of ions which prefer A-site occupancy leads to detrimental reactions with humidity in the air and crumbling of resultant products.

By way of example, the following sintering aids, which consist only of cations demonstrated to prefer B-site occupancy in the lanthanide chromite structure, may be employed. The incorporation of these materials into the lanthanide chromite matrix will contribute to reaction-based sintering, as the spinel materials form solid solutions with the matrix of the lanthanide chromite (e.g., LSC or LSCM):

1. $ZnMn_2O_4$, a spinel oxide with sintering temperatures of less than about 1400° C. Alternatives include Zn in the A-site of materials in the same family of compounds that include but are not limited to spinels and inverse spinels (oxides with the formula $AB_2O_4$ or $A_2BO_4$ containing the elements Fe, Cu, Zn, Ni, Cr, Mn, V, Ga and Al among others).
2. $MgMn_2O_4$ a spinel oxide with sintering temperatures of less than about 1400° C. Alternatives include Mg in the A-site of materials in the same family of compounds that include but are not limited to spinels and inverse spinels (oxides with the formula $AB_2O_4$ or $A_2BO_4$ containing the elements Fe, Cu, Zn, Ni, Cr, Mn, V, Ga and Al among others).
3. $MnMn_2O_4$ a spinel oxide with sintering temperatures of less than about 1400° C. Alternatives include Mn in the A-site of materials in the same family of compounds that include but are not limited to spinels and inverse spinels (oxides with the formula $AB_2O_4$ or $A_2BO_4$ containing the elements Fe, Cu, Zn, Ni, Cr, Mn, V, Ga and Al among others).
4. $CoMn_2O_4$ a spinel oxide with sintering temperatures of less than about 1400° C. Alternatives include Co in the A-site of materials in the same family of compounds that include but are not limited to spinels and inverse spinels (oxides with the formula $AB_2O_4$ or $A_2BO_4$ containing the elements Fe, Cu, Zn, Ni, Cr, Mn, V, Ga and Al among others).

One or more of the spinel oxide sintering aids may be added to the lanthanide chromite ceramic(s) in any of a variety of ways prior to sintering, such as simple mixing. In one example, from 0.1 to 50 volume percent sintering aid may be added, wherein the amount of sintering aid is measured as a volume percent of the combined volume of ceramic(s) and sintering aid(s) prior to sintering. In another example, sintering aid(s) is added between 0.1 to 20 volume percent, or between 0.1 and 5 volume percent. After mixing, the mixture is sintered at a temperature lower than that necessary for densification of the ceramic(s) if the sintering aid were not present. In some examples, the addition of the sintering aid(s) results in densities greater than 90 percent of theoretical at sintering temperatures less than 1500° C. In addition, in some versions, the addition of the sintering aid(s) also improves the conductivity of the resulting product.

The densification method of this disclosure results in product densities greater than about 80 percent, preferably greater than about 85 percent, more preferably greater than about 90 percent, and even more preferably greater than about 95 percent, of theoretical density at sintering temperatures less than about 1500° C., preferably less than about 1400° C. Preferred sintering temperatures can range from about 1100° C. to about 1500° C.

In the densification method, the sintering is carried out for a time sufficient to form the sintered product. The sintering time can typically range from about 0.1 hours to about 20 hours or more, preferably from about 1 to about 12 hours, and more preferably from about 2 to about 10 hours.

The sintering aids may be used in processes for producing any of a variety of products made by sintering lanthanide chromite ceramic(s) or multi-phase ceramic compositions containing lanthanide chromite ceramic and one or more ionically conducting ceramics. For example, the spinel oxide based sintering aids described herein may be mixed with a lanthanide chromite ceramic(s), and the mixture then sintered at a temperature less than 1500° C. in order to form an interconnect (e.g., for an SOFC).

The following description of certain examples of the disclosure should not be used to limit the scope of the present disclosure. Other examples, features, aspects, embodiments, and advantages of the disclosure will become apparent to those skilled in the art from the following description, which is by way of illustration, one of the best modes contemplated for carrying out the disclosure. As will be realized, the disclosure is capable of other different and apparent aspects, all without departing from the disclosure. For example, while various examples described herein disclose the use of sintering aids for the densification of lanthanum chromite doped with Sr, Mn and V, the sintering aids, processes, products and other features may be employed with other types of lanthanide chromite ceramics. Accordingly, the descriptions and data herein should be regarded as illustrative in nature and not restrictive.

It should be apparent to those skilled in the art that this disclosure may be embodied in many other specific forms without departing from the spirit of scope of the disclosure.

Example 1

$ZnMn_2O_4$ can be synthesized in any of a variety of ways known to those skilled in the art. FIG. 1 depicts the x-ray diffraction pattern for $ZnMn_2O_4$ prepared from ball milled mixtures constituent oxides and calcined at 800° C. and 1000° C., and demonstrates that $ZnMn_2O_4$ processed at 1000° C. forms its spinel structure.

Example 2

Figure 2:
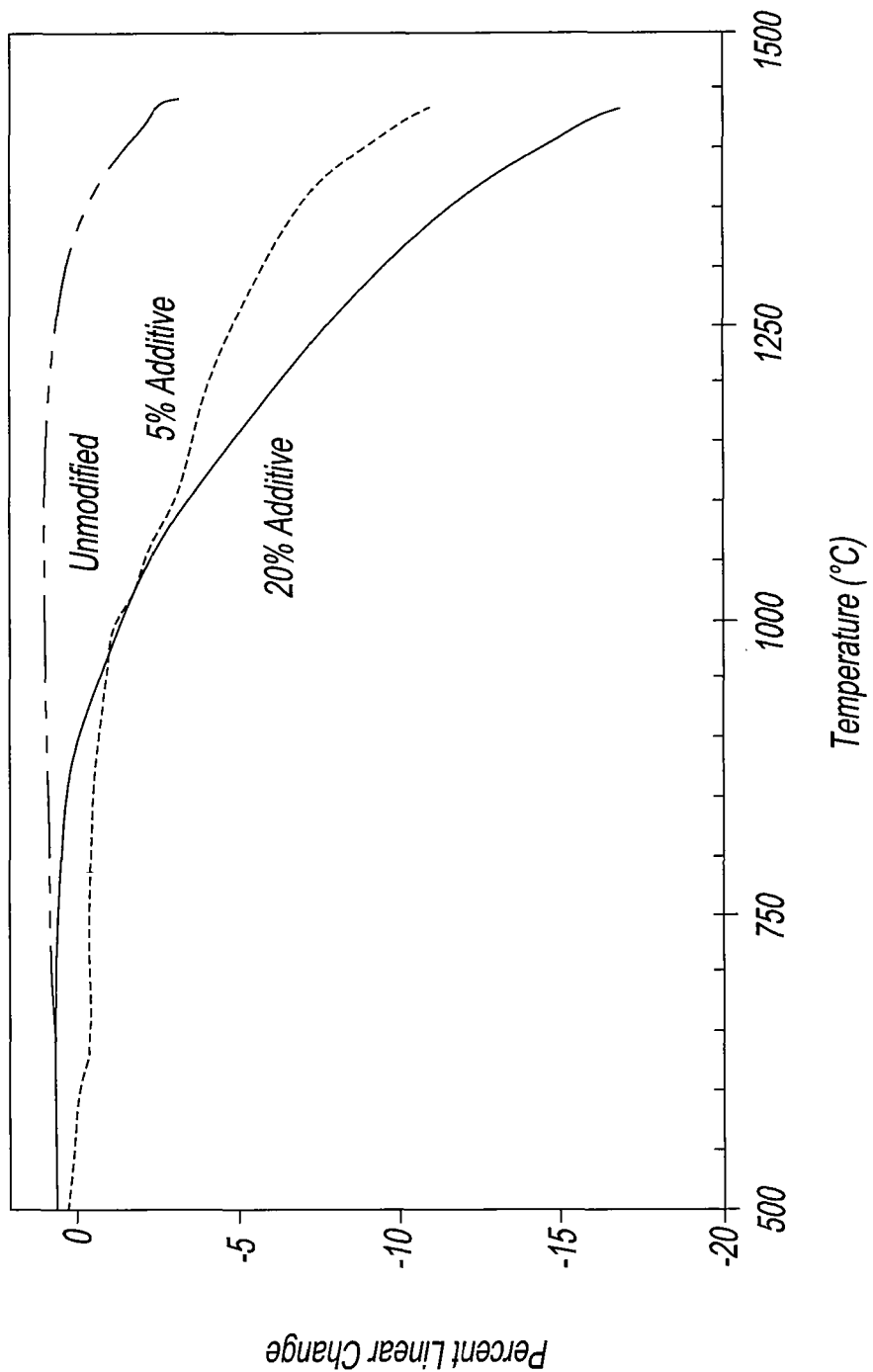
FIG. 2 graphically depicts sintering dilatometry for (La,Sr)(Mn,Cr,V)$O_3$ powder and two samples doped with $ZnMn_2O_4$ sintering aid, at 5% and 20% additive, in accordance with Example 2.
Figure 3:
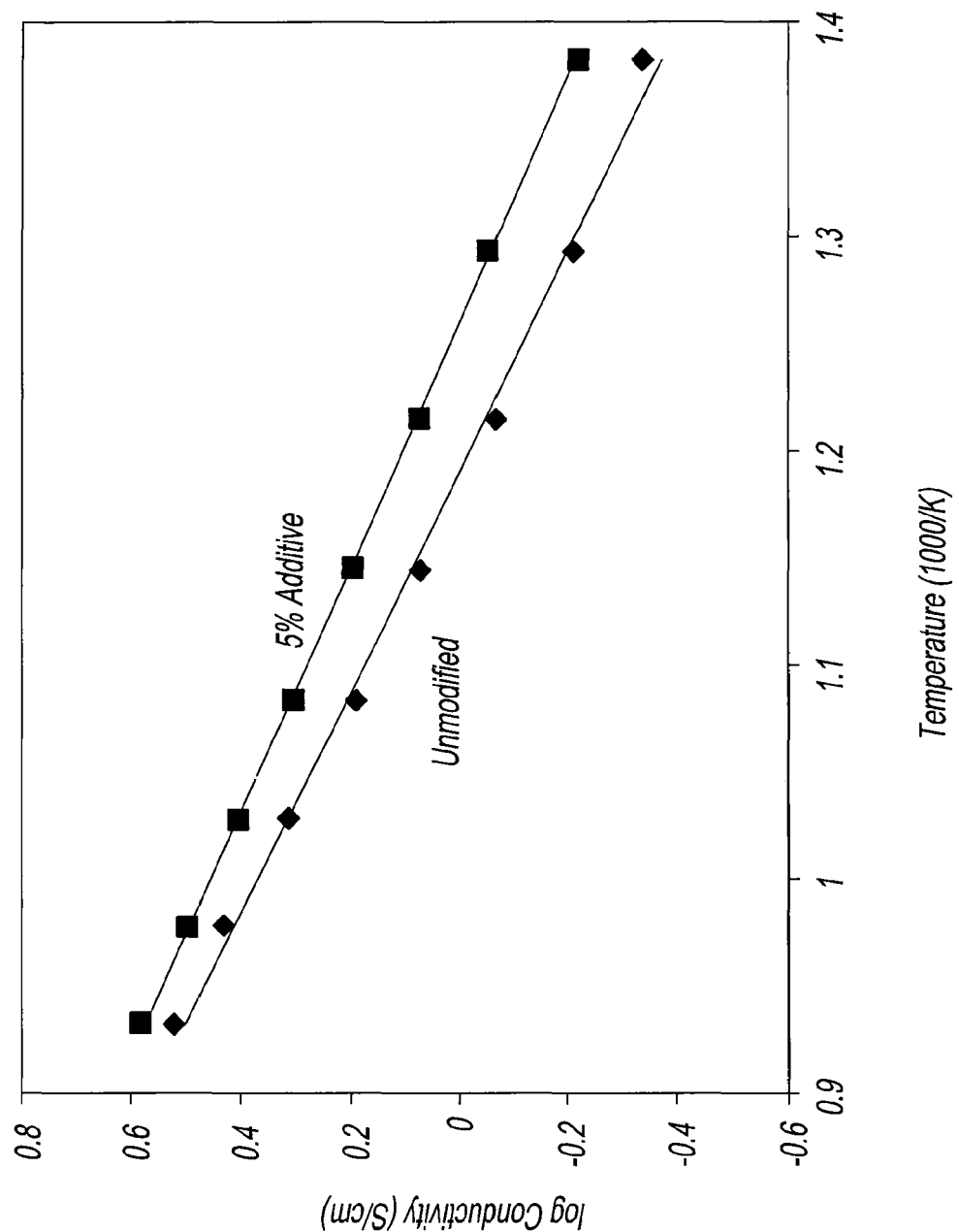
FIG. 3 graphically depicts bulk conductivity (in air) for (La,Sr)(Mn,Cr,V)$O_3$ and a sample doped with 5% $ZnMn_2O_4$ sintering aid in accordance with Example 2.

$ZnMn_2O_4$ processed at 1000° C. was mixed with $(La_{0.825}Sr_{0.175})_{0.95}Cr_{0.72}Mn_{0.26}V_{0.02}O_{3-\delta}$ at both 20 vol % and 5 vol %. As shown in FIG. 2, the addition of the sintering aid significantly changes the sintering behavior of the product in air. The addition of the zinc manganite enhanced densification (FIG. 2), which also resulted in an improvement in the conductivity of the material in air (see FIG. 3). Together, these results demonstrate the utility of the approach, the impact on sintering behavior, and the positive effect on conductivity.

Example 3

Figure 4:
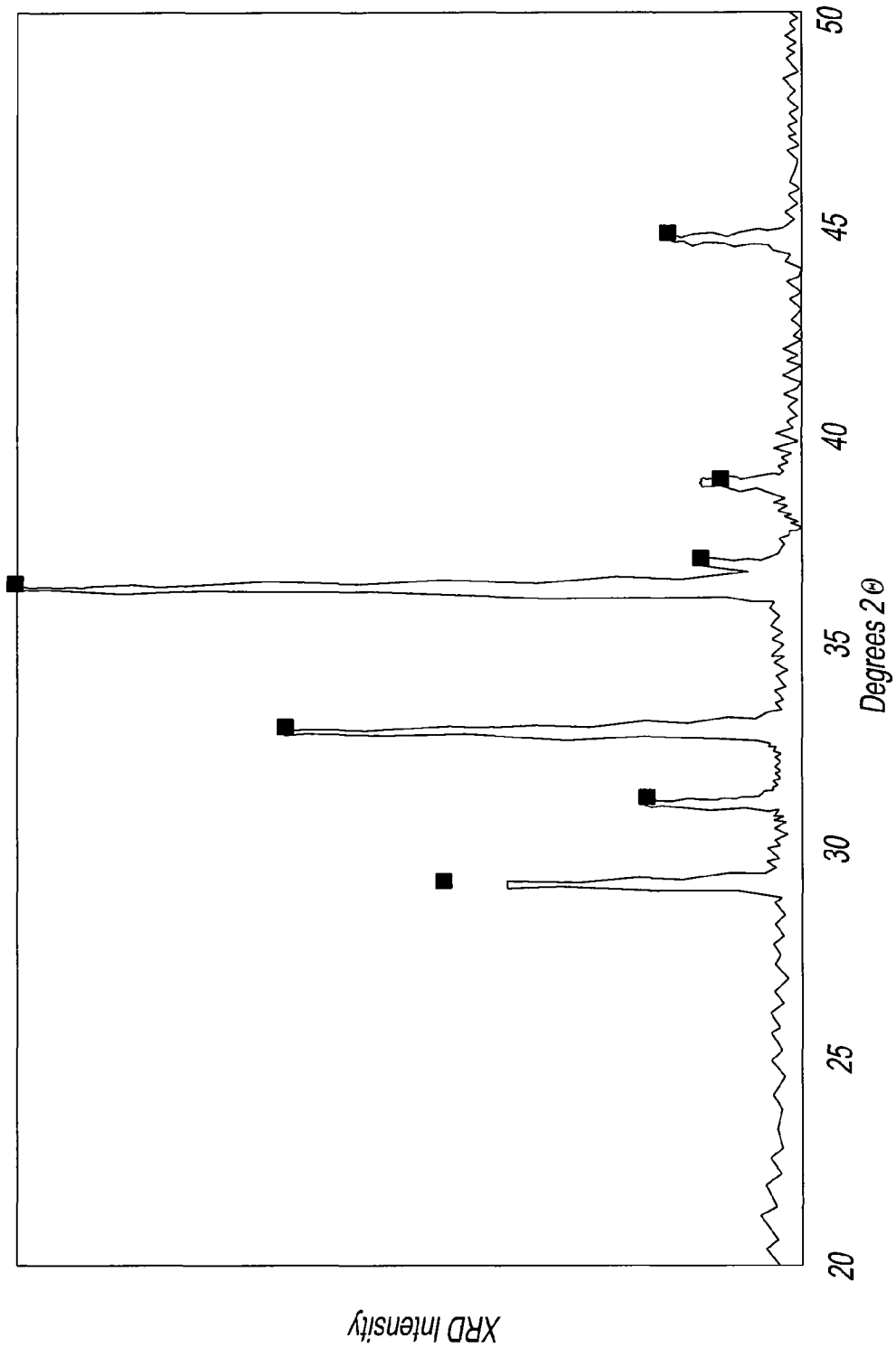
FIG. 4 is a x-ray diffraction analysis of zinc manganite ($ZnMn_2O_4$) synthesized by solid state reaction of Example 3.

Solid State Synthesis $ZnMn_2O_4$ 34 grams of ZnO and 98 grams of $MnCO_3$ were weighed, mixed, and ball milled Nalgene container with isopropanol and 1 cm diameter partially stabilized zirconia media for 2 hours. The resulting slurry was dried and sieved through 35 mesh. The powder was calcined at 1000° C. for 4 hours in air to produce a granular oxide product. X-ray diffraction analysis was performed on the resulting powder (FIG. 4), which indicated that the material was phase pure $ZnMn_2O_4$. The resultant powder was milled in an attrition mill to achieve a surface area of 18 $m^2/g$.

Example 4

Chemical Precipitation Synthesis of $ZnMn_2O_4$

Zinc nitrate and manganese (II) acetate, were weighed to the stoichiometric 1:2 Zn:Mn ratios and dissolved in deionized water to create solutions. The solutions were combined and stirred to homogenize them, then were added to an ammonia carbonate solution to precipitate a combined hydroxide-carbonate precursor gel.

Figure 5:
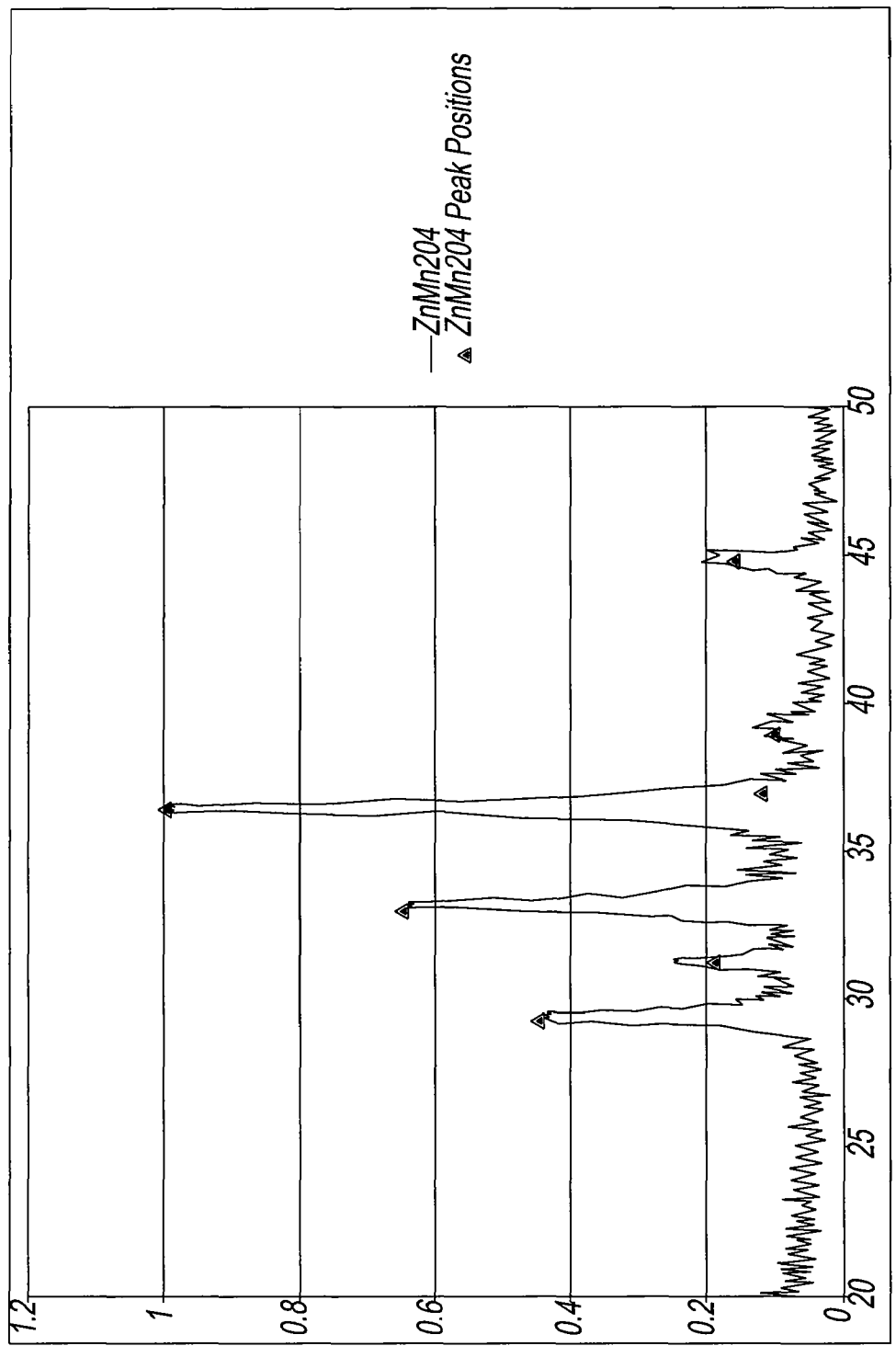
FIG. 5 is a x-ray diffraction analysis of zinc manganite ($ZnMn_2O_4$) synthesized by chemical precipitation reaction of Example 4.

The precipitate was stirred for 1 hour, physically filtered and dried in a convection oven at 100° C. for 1 hour. The powder was calcined at 500° C. for 3 hours in air. X-ray diffraction analysis (FIG. 5) performed on the resulting oxide powder demonstrated the material was phase pure $ZnMn_2O_4$. Surface area analysis (BET analysis) determined the powder had a specific surface area of 40 $m^2/g$.

Example 5

Sintering of Lanthanum Chromite

To demonstrate the effectiveness of the use of the disclosed sintering aids, the impact of $ZnMn_2O_4$ on the densification of $La_{0.8}Sr_{0.2}CrO_3$ (LSC) was assessed by dilatometry. Using the theoretical density of LSC, and $ZnMn_2O_4$ (6.64, and 5.41 $g/cm^3$, respectively) appropriate weight ratios of the oxides were determined to produce a composite ceramic body with 95 percent LSC and 5 volume percent $ZnMn_2O_4$.

LSC powder, produced by chemical precipitation and calcination at 1300° C., was milled using isopropanol as a solvent in an attrition mill for one hour, and then dried to produce a material with a surface area of 8.42 $m^2/g$ after drying. Composite mixtures were produced by adding the sintering aid powders to the LSC powder prior to attrition milling for another 2 hours and drying at 60° C. The resultant mixed powder exhibited a surface area of 14.74 $m^2/g$.

Figure 6:
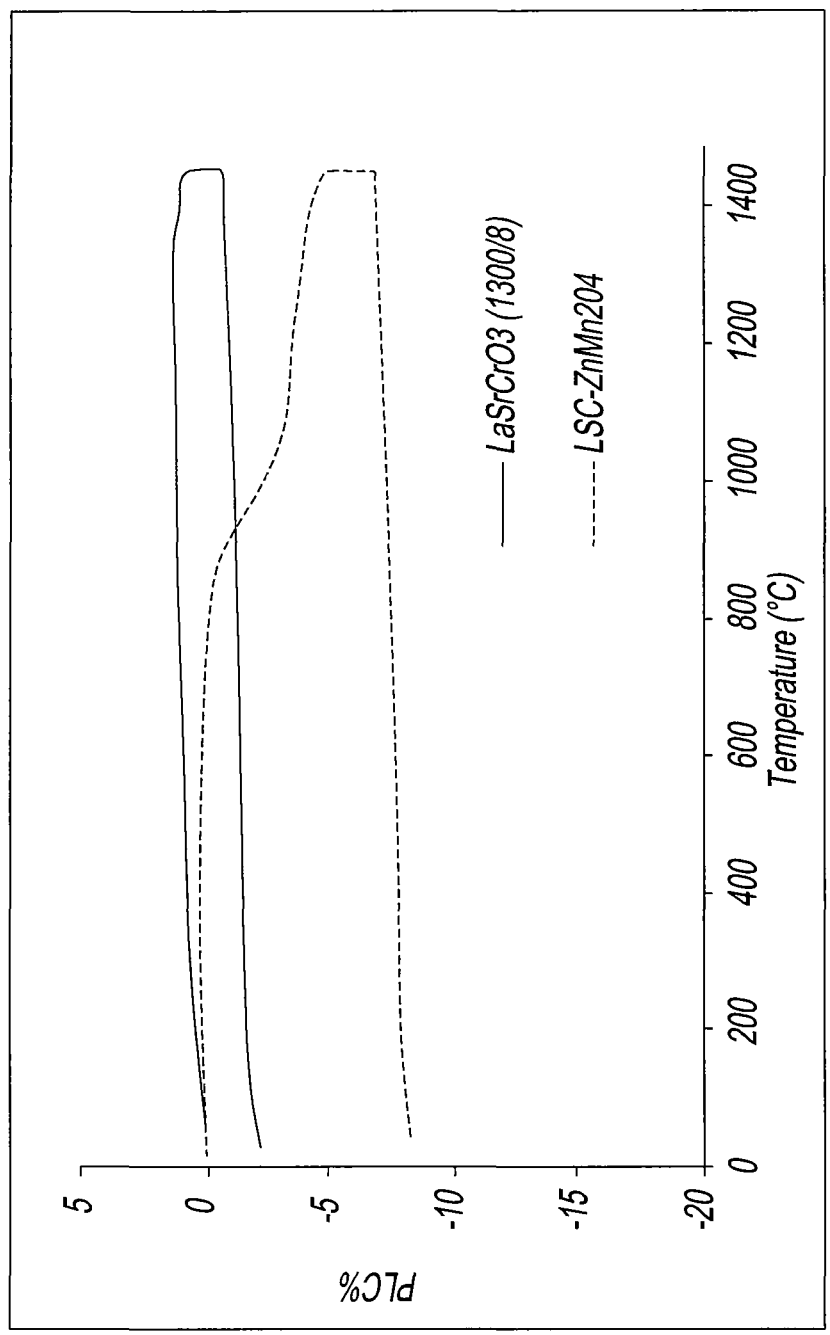
FIG. 6 graphically depicts dilatometry curves of LSC ceramics with and without 5% $ZnMn_2O_4$ of Example 5.

Both the undoped and $ZnMn_2O_4$-doped LSC powders were sieved through a 60 mesh screen and cold-isostatically pressed (20,000 psi) into bars. Samples of each material were characterized by sintering dilatometry at 1450° C. in air, with a heating and cooling rate of 3° C./minute, and a sintering hold of 8 hours at temperature. Dilatometry curves of the powders with and without sintering additives are shown in FIG. 6.

As is clearly shown by the data, the sintering shrinkage of the doped materials is markedly different from that of the undoped material. Deviations in sintering performance are clear below 750° C., but at approximately 915° C., significant shrinkage events occur in the $ZnMn_2O_4$ doped material which also exhibits additional shrinkage around 1000° C. At 1450° C., the doped material also experience significantly greater shrinkage during the 8 hour hold. Upon cooling, the materials exhibit similar shrinkage, indicating the coefficient of thermal expansion of the composites is very close to that of the undoped material.

The density of the sintered parts were measured by Archimedes' principle in isopropanol after cooling. The undoped LSC sample exhibited a value of 4.17 $g/cm^3$ (64% theoretical) compared with 4.23 $g/cm^3$ (65% theoretical) for the 5% $ZnMn_2O_4$ sample.

Figure 7:
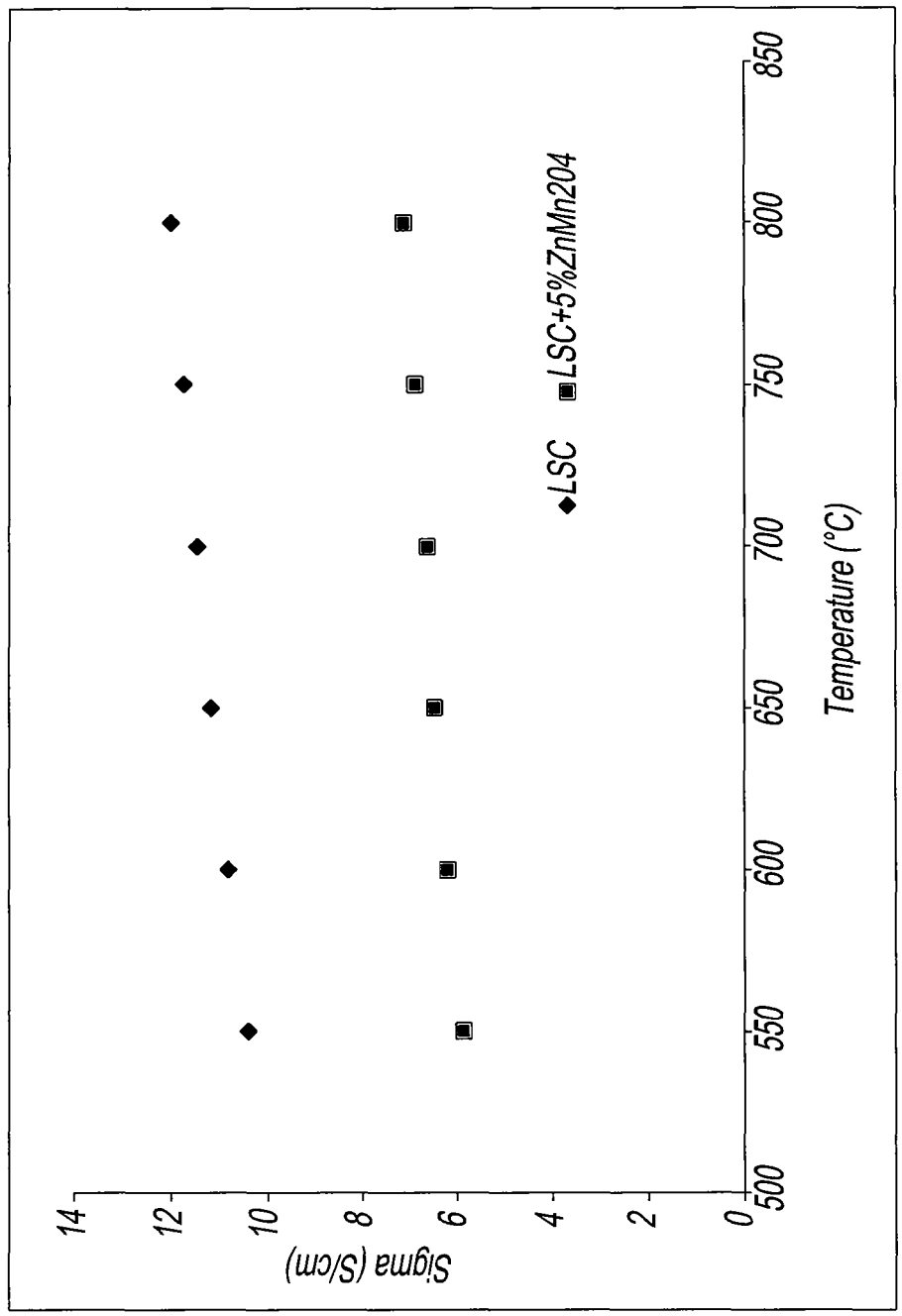
FIG. 7 graphically depicts bulk conductivity of LSC and 5% $ZnMn_2O_4$ doped LSC of Example 5.

Discs of the materials were pressed and sintered at 1450° C. for 8 hours. The discs were machined to produce bars, electroded and 4-point electrical conductivity measurements were made in air. Conductivity was assessed at temperatures between 550° C. and 800° C. Data collected for the materials are shown in FIG. 7 showing that the electrical conductivity in air of the 5 volume percent doped material is lower than the undoped material, but remains within the same order of magnitude.

Example 6

Sintering of $La_{0.75}Sr_{0.25}Mn_{0.50}Cr_{0.50}O_3$ (Impact of $ZnMn_2O_4$ Dopant Concentration)

To demonstrate the effectiveness of the sintering approach, the impact of $ZnMn_2O_4$ on the densification of $(La_{0.75}Sr_{0.25})_{0.95}Mn_{0.50}Cr_{0.50}O_3$ (LSCM) was assessed by dilatometry. Using the theoretical density LSCM and $ZnMn_2O_4$ (6.51 and 5.41 $g/cm^3$, respectively), appropriate weight ratios of the oxides were determined to produce composite ceramic bodies. $ZnMn_2O_4$ additions of 1, 3 and 5 volume percent were determined, with the balance of each powder being made up of LSCM.

LSCM powder, produced by solid state reaction and calcination at 1400° C., milled using isopropanol as a solvent in an attrition mill for one hour, to produce a material with a surface area of 5.98 $m^2/g$ after drying. Composite mixtures were produced by adding the sintering aid powders to the LSCM powder prior to attrition milling for one hour. The resultant powders exhibited surface areas of 13.2, 13.0, and 10.94 $m^2/g$ for the $ZnMn_2O_4$ doped materials of 1, 3 and 5 volume percent, respectively.

Figure 8:
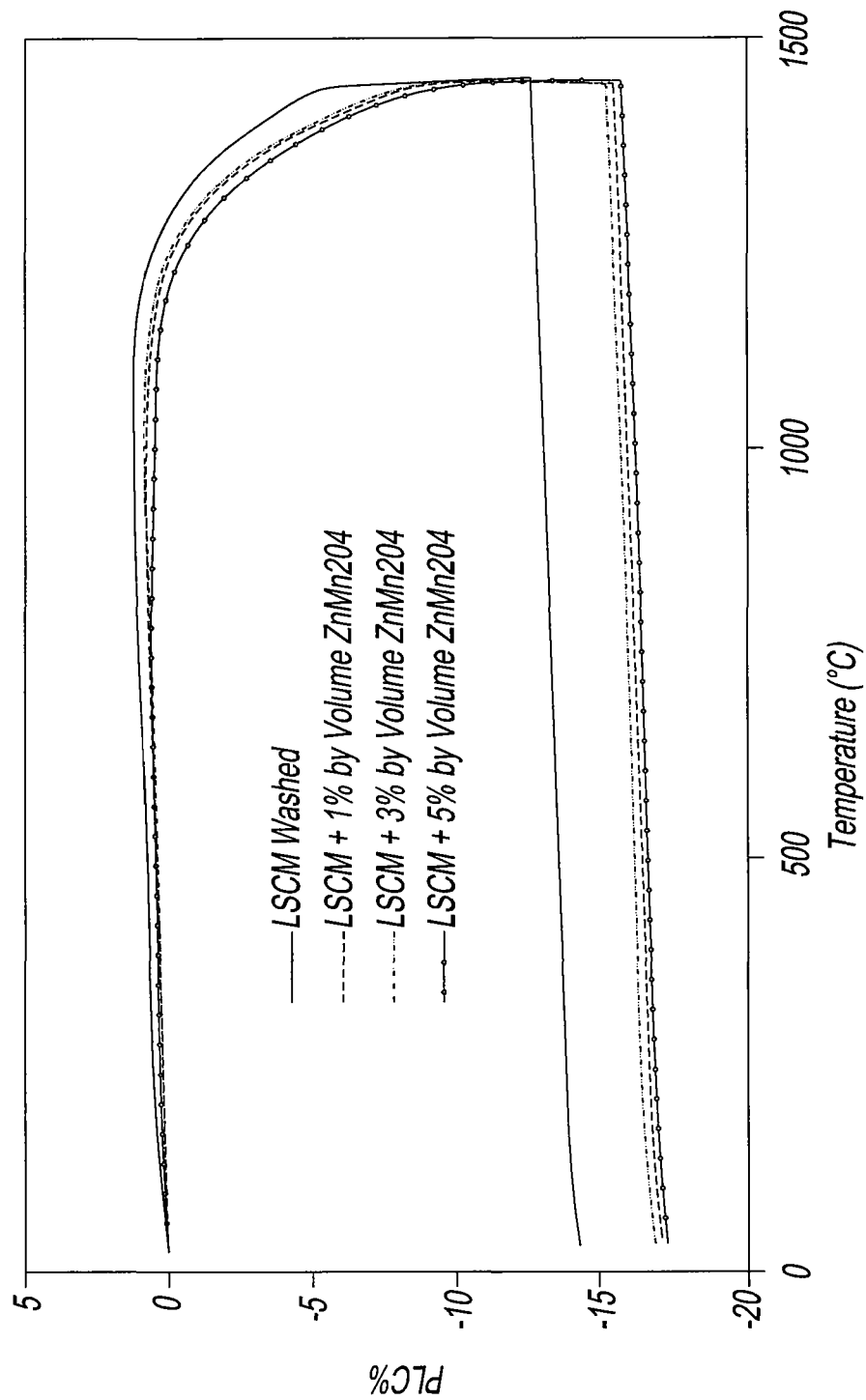
FIG. 8 graphically depicts dilatometry curves of LSCM ceramics with varying additions of $ZnMn_2O_4$ additive of Example 6.

The resultant mixtures were dried at 60° C., sieved through a 60 mesh screen and cold-isostatically pressed (20,000 psi) into bars. Samples of each material were characterized by sintering dilatometry at 1450° C. in air, with a heating and cooling rate of 3° C./minute, with a sintering hold of 8 hours at temperature. Dilatometry curves of the powders with sintering additives are shown in FIG. 8.

LSCM without the sintering aid demonstrates monotonic shrinkage above 1300° C., and a total shrinkage of 12.54 percent was observed during the experiment. For the 5 percent $ZnMn_2O_4$ addition, a more pronounced shift in sintering onset to 1175° C. was observed, and shrinkage of 15.7 percent linear change during the soak at 1450° C. For 3 percent $ZnMn_2O_4$ doping, sintering onset was observed at 1200° C. and 15.2 percent linear change during the 1450° C. soak. The one percent doping concentration resulted in sintering onset was observed at 1200° C. and 15.5 percent linear change during the 1450° C. soak.

Figure 9:
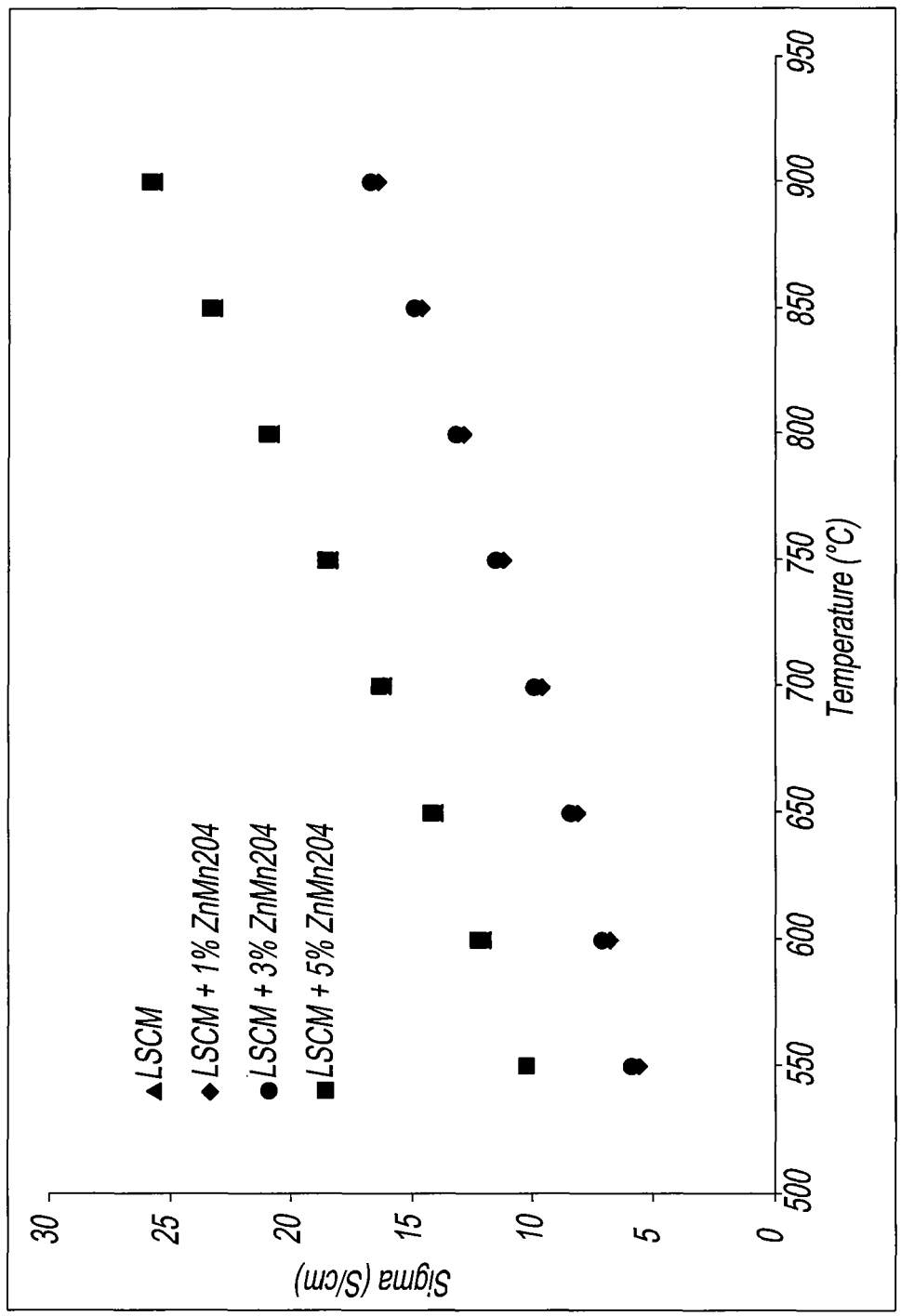
FIG. 9 graphically depicts bulk conductivity (in air) of LSCM ceramics with varying additions of $ZnMn_2O_4$ additive of Example 6.

The density values of the sintered parts were measured by Archimedes' principle in isopropanol after cooling. The undoped LSCM powder exhibited a value of 5.97 g/cm$^3$ (92% theoretical) compared with 6.10 g/cm$^3$ (94%), 6.08 g/cm$^3$ (93%), and 6.15 g/cm$^3$ (95%) for the 1, 3 and 5% $ZnMn_2O_4$ samples. Discs of the materials were pressed and sintered at 1450° C. for 8 hours. The discs were machined to produce bars, electroded and tested in 4-point configuration in air. Conductivity was assessed at temperatures between 550° C. and 900° C. Data collected for the materials are shown in FIG. 9 showing that the conductivity of the 5 volume percent doped material is equivalent to that of the undoped material. The one and three volume percent doping levels show slightly lower conductivity values, but remain within the same order of magnitude as the undoped material.

Example 7

Sintering of $(La_{0.825}Sr_{0.175})_{0.95}(Cr_{0.72}Mn_{0.26}V_{0.02})O_{3-\delta}$ To demonstrate the effectiveness of the sintering approach, the impact of $ZnMn_2O_4$ on the densification of $(La_{0.825}Sr_{0.175})_{0.95}(Cr_{0.72}Mn_{0.26}V_{0.02})O_{3-\delta}$ (LSCMV) was assessed by dilatometry. Using the theoretical density LSCMV and $ZnMn_2O_4$ (6.41 and 5.41 g/cm$^3$, respectively), appropriate weight ratios of the oxides were determined to produce composite ceramic bodies. $ZnMn_2O_4$ additions of 1, 3 and 5 volume percent were determined, with the balance of each powder being made up of LSCMV.

LSCMV powder, produced by solid state reaction and calcination at 1400° C., was milled using isopropanol as a solvent in an attrition mill for one hour, to produce a material with a surface area value of 13 m$^2$/g after drying. Composite mixtures were produced by adding the sintering aid powders to the LSCMV powder prior to attrition milling for one hour. The resultant powders exhibited surface areas of 15.1, 15.3, and 15.1 m$^2$/g for the $ZnMn_2O_4$ doped materials of 1, 3 and 5 volume percent, respectively.

Figure 10:
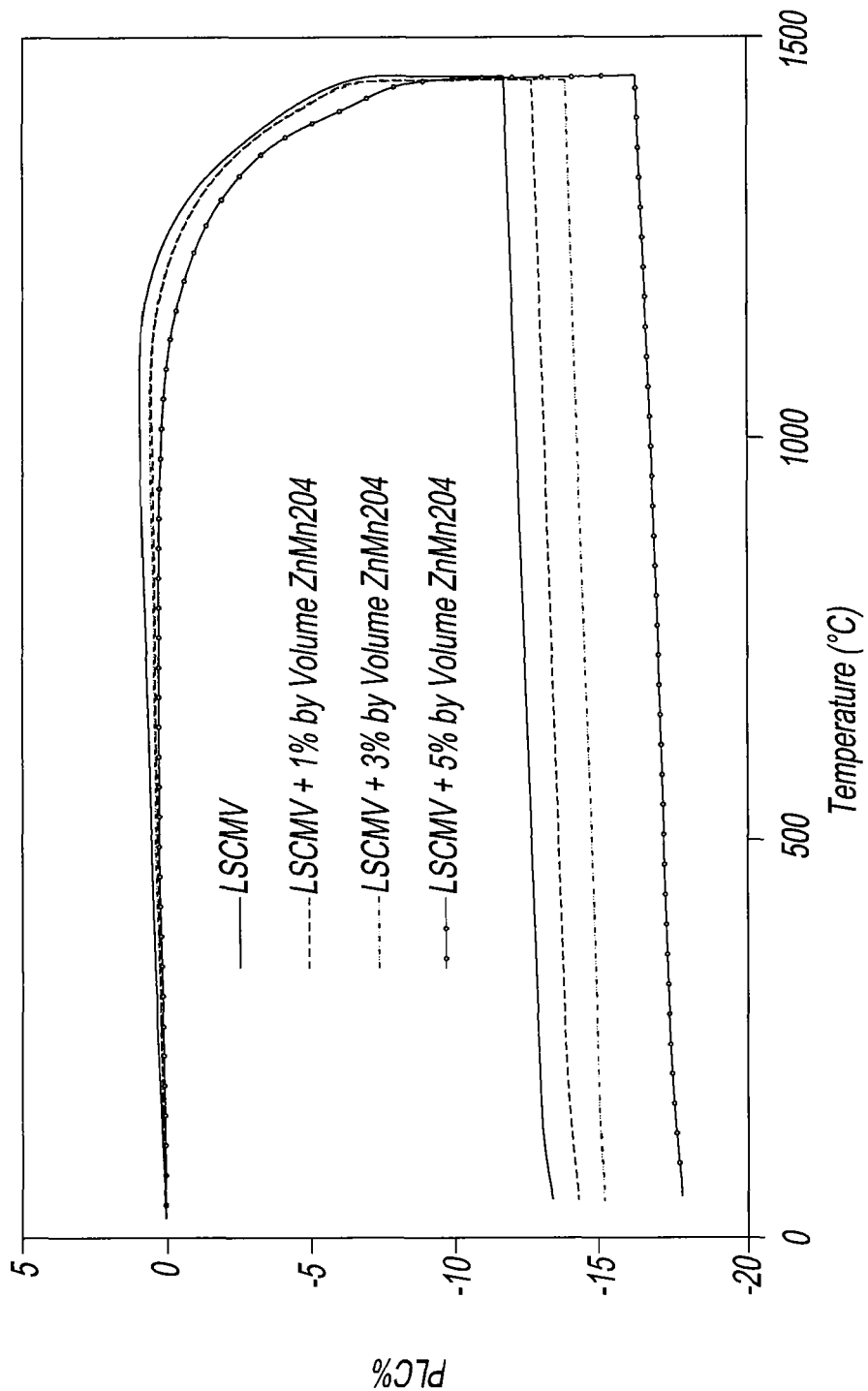
FIG. 10 graphically depicts dilatometry curves of LSCMV ceramics with and without disclosed additives of Example 7.

The powders were sieved through a 60 mesh screen and cold-isostatically pressed (20,000 psi) into bars. Samples of each material were characterized by sintering dilatometry at 1450° C. in air, with a heating and cooling rate of 3° C./minute, with a sintering hold of 8 hours at temperature. Dilatometry curves of the powder with sintering additives are shown in FIG. 10.

LSCMV without sintering aid exhibited monotonic shrinkage above 1300° C. The shrinkage at 1450° C. for 8 hours is 11.5 percent linear change. For the 5 percent $ZnMn_2O_4$ addition, a more pronounced shift in sintering onset to 1175° C. was observed, and shrinkage of 16.04 percent linear change during the soak at 1450° C. The additions of 1 and 3% $ZnMn_2O_4$ also improved the sintering behavior of LSCMV. The shrinkage was 12.6 and 13.7 percent linear change for the 1 and 3% $ZnMn_2O_4$ doped compositions respectively.

The densities of the sintered parts were measured by Archimedes' principle in isopropanol after cooling. The undoped LSCMV sample exhibited a value of 4.91 g/cm$^3$ (76% theoretical) contrasted to 5.17 (81% theoretical), 5.37 g/cm$^3$ (84% theoretical), and 5.62 g/cm$^3$ (88% theoretical) for the 1, 3, and 5% $ZnMn_2O_4$ doped samples respectively.

Figure 11:
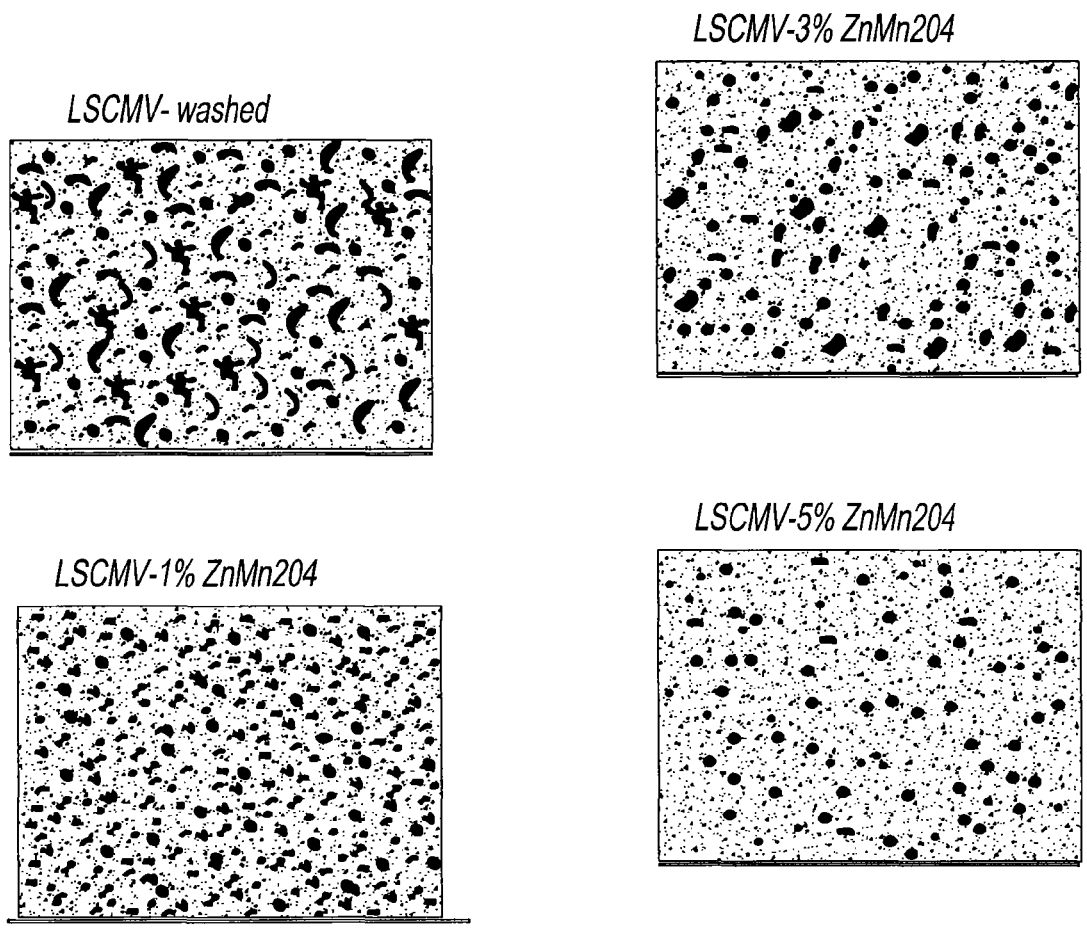
FIG. 11 shows photomicrographs the sintered microstructure for the undoped material and the three doped samples of Example 7.

In order to determine the effect of sintering temperature on densification, samples were annealed at higher temperatures. Density was measured by Archimedes' method on samples that were annealed at 1500° C. for 8 hours. The density results are compared to those obtained on dilatometry bars in Table 1. By increasing the sintering temperature 50° C., it was possible to achieve >90% densification in all the composites prepared with $ZnMn_2O_4$. The impact on sintering density for the four compositions can be observed in the micrographs in FIG. 11, which compares the sintered microstructure for the undoped material and the three doped samples. The increasing doping content clearly improves the sample density and reduces the amount of porosity in the sample.

TABLE 1

Densification Improvement with Sintering Temperature

| Sintering Temperature | 1450° C. | 1500° C. |
|---|---|---|
| LSCMV Unwashed | 76.7% | 83.6% |
| LSCMV Washed + 1% $ZnMn_2O_4$ | 81.3% | 91.6% |
| LSCMV Washed + 3% $ZnMn_2O_4$ | 84.5% | 95.6% |
| LSCMV Washed + 5% $ZnMn_2O_4$ | 88.6% | 97.4% |

Figure 12:
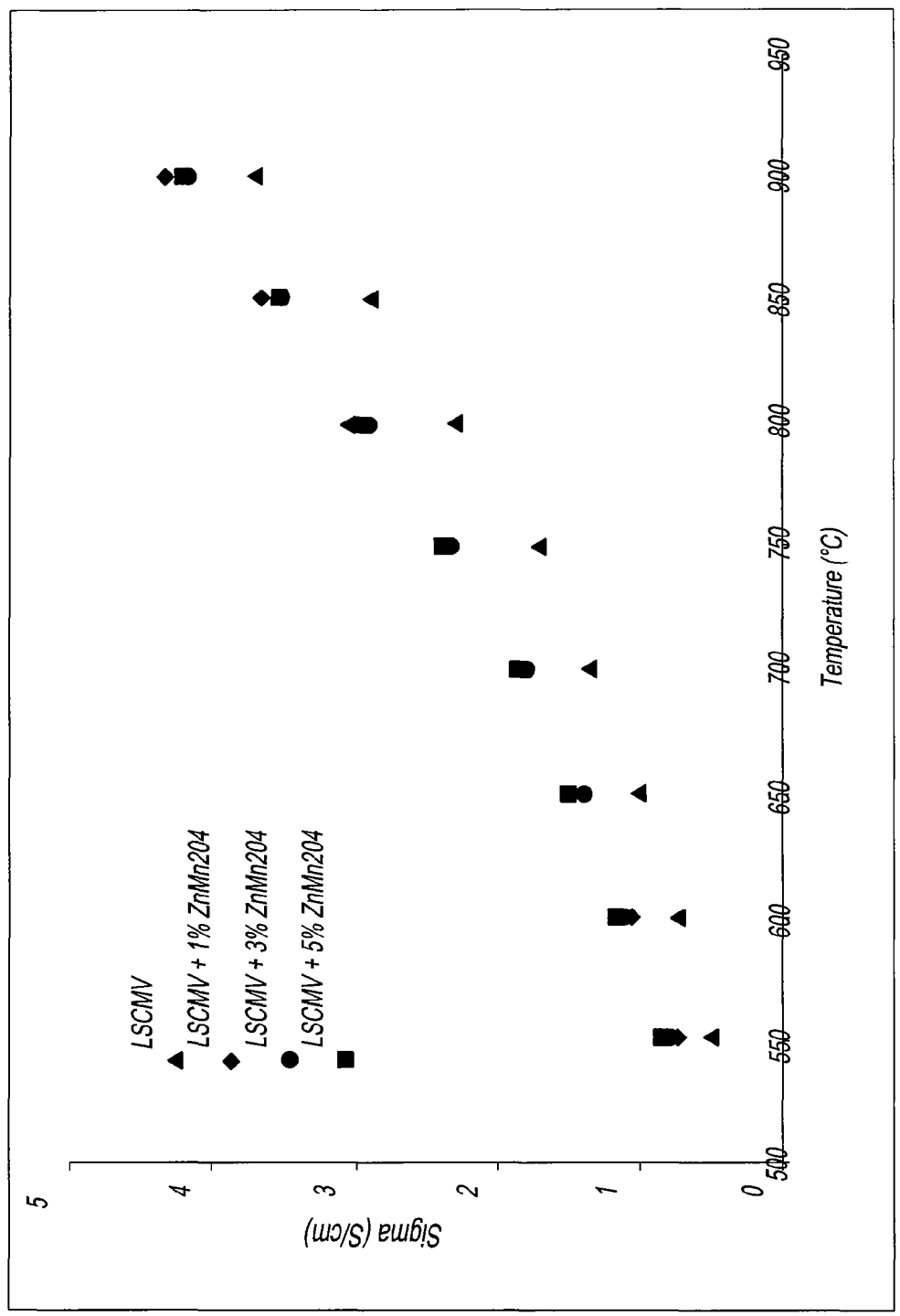
FIG. 12 graphically depicts bulk conductivity (in air) of LSCMV ceramics with varying additions of $ZnMn_2O_4$ additive of Example 7.
Figure 13:
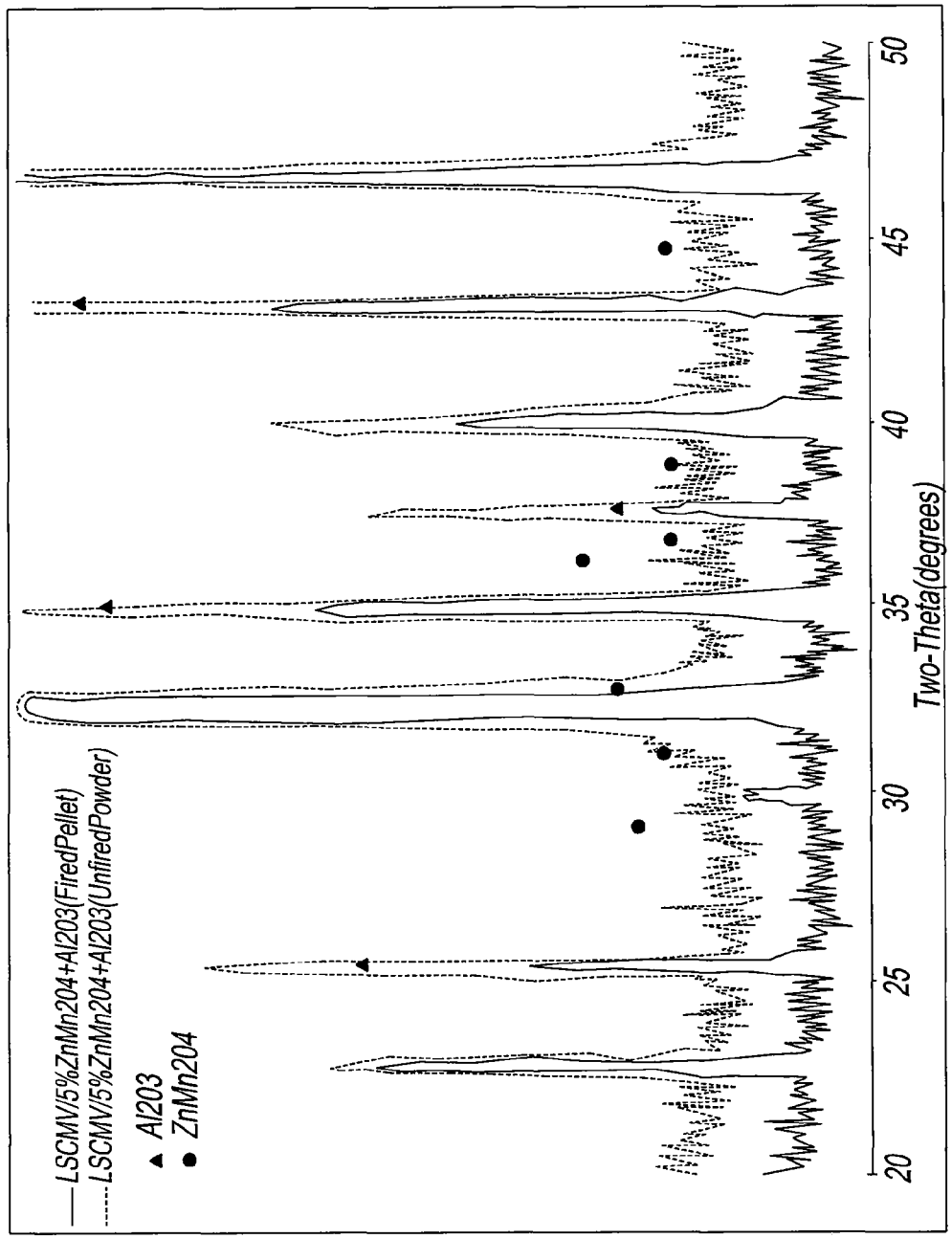
FIG. 13 graphically depicts the x-ray diffraction pattern of LSCMV powder with 5% $ZnMn_2O_4$ before and after sintering at 1500° C. for 8 hours of Example 7.

Discs of the materials were pressed and sintered at 1500 C, 8 hours. The discs were machined to produce bars, electroded and tested in 4-point configuration in air. Conductivity was assessed at temperatures between 550° C. and 900° C. Data collected for the materials are shown in FIG. 12. In the case of the LSCMV samples, the conductivity of the doped samples is slightly improved compared to the undoped material.

The x-ray diffraction pattern of the 5% $ZnMn_2O_4$ doped sample sintered at 1500° C. for eight hours was compared with those of the mixed starting powder in FIG. 12, by overlapping the position of alpha-alumina standard powder which was added to both samples prior to analysis. It can be observed that the peaks associated with the $ZnMn_2O_4$ (marked by the closed circles) have diminished, providing evidence that the sintering aid has formed a solid solution with the majority phase perovskite. The remaining unmarked peaks in the pattern correspond to the perovskite structure; these peaks show only narrowing of the peak width, which would be expected from the greater crystallinity of the sintered sample.

Example 8

Sintering of $(La_{0.825}Sr_{0.175})_{0.95}(Cr_{0.72}Mn_{0.26}V_{0.02})O_{3-\delta}$/10-ScSZ Composites The impact of $ZnMn_2O_4$ on the density of 10-ScSZ ($Zr_{0.90}Sc_{0.10}O_{2-\delta}$, or 10 mol % Sc doped $ZrO_2$) composites with $(La_{0.825}Sr_{0.175})_{0.95}(Cr_{0.72}Mn_{0.26}V_{0.02})O_{3-\delta}$ (LSCMV) was assessed by a sintering study and subsequent Archimedes' density measurements. Appropriate amounts of LSCMV/10-ScSZ/$ZnMn_2O_4$ oxides were weighed to produce composite ceramic bodies. 10-ScSZ was mixed with LSCMV and LSCMV/ZnMn$_2$O$_4$ (5 volume percent) at a 50/50 by volume ratio.

Composite mixtures were produced by adding 10-ScSZ to the LSCMV and LSCMV/ZnMn$_2$O$_4$ powders prior to ball milling for 24 hours. The resultant powders exhibited surface areas of 10.38 and 11.41 m$^2$/g for the LSCMV and the ZnMn$_2$O$_4$-doped LSCMV respectively.

The composite powders were sieved through a 60 mesh screen and cold-isostatically pressed (20,000 psi) into pellets. Samples of each material were sintered in air from 1100° C. to 1500° C., with a heating and cooling rate of 3° C./minute, with a sintering hold of 8 hours at temperature.

Figure 14:
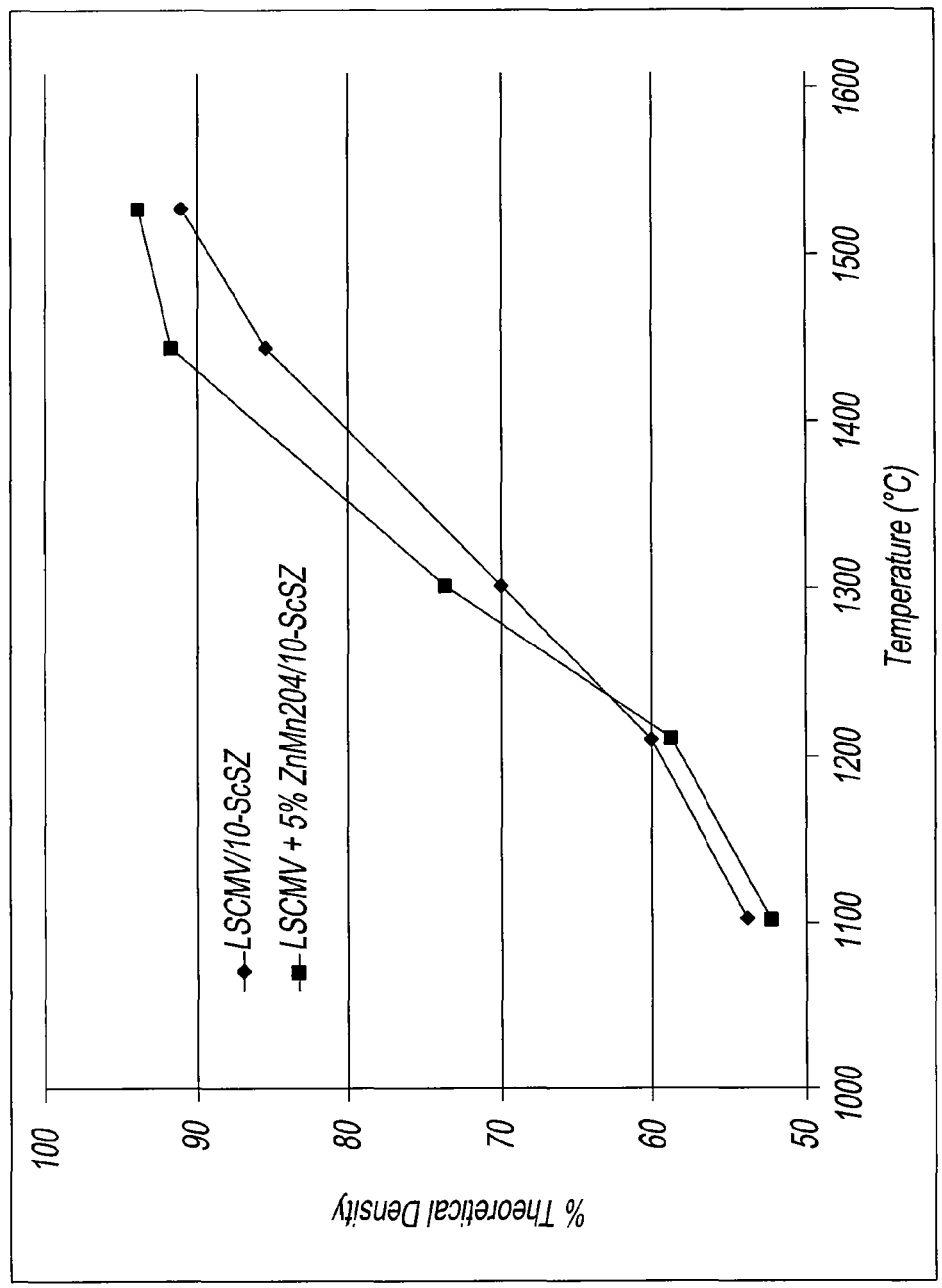
FIG. 14 graphically depicts the bulk density of Scandia-doped zirconia/LSCMV composites with and without 5% $ZnMn_2O_4$ additive sintered at temperatures ranging between 1100° C. and 1500° C. of Example 8.

The densities of the sintered parts were measured by Archimedes' principle in isopropanol after cooling. The sintering behavior of the composites is shown in FIG. 14. Both compositions showed similar densification at lower temperatures. Above 1300° C. a clear improvement in densification is observed for the material with sintering aid. The composite containing ZnMn$_2$O$_4$ exhibits 91.5% theoretical density at 1450° C., and 93.5% theoretical density at 1500° C., compared with 85.3 and 90.9% for the undoped composite at the same temperatures. The sintering aid clearly had a strong impact on sintering behavior of the composites.

Figure 15:
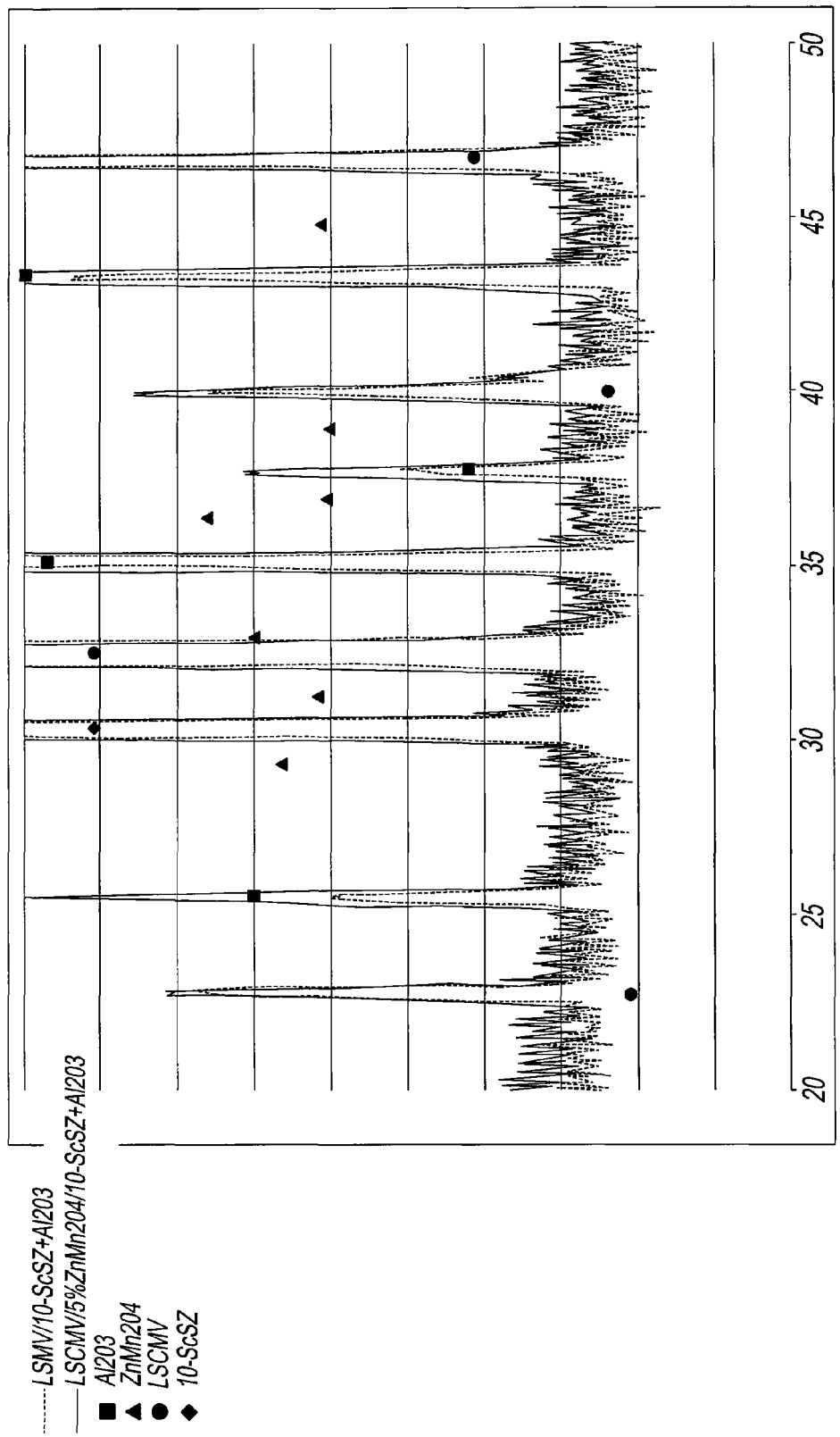
FIG. 15 graphically depicts the x-ray diffraction pattern of sintered composite materials containing equal volumes of LSCMV and 10 mole percent Scandia doped zirconia, with and without a 5% addition of $ZnMn_2O_4$ to the LSCMV component. The powders have been sintered at 1500° C. for 8 hours as is reported in Example 8.

The x-ray diffraction pattern of the LSCMV/10-ScSZ (Zr$_{0.90}$Sc$_{0.10}$O$_{2-\delta}$, or 10 mol % Sc doped ZrO$_2$) composites with and without 5% ZnMn$_2$O$_4$ doping that were sintered at 1500° C. for eight hours are compared FIG. 15. The patterns were aligned by overlapping the position of alpha-alumina standard powder which was added to both samples prior to analysis. It can be observed that the peaks associated with the ZnMn$_2$O$_4$ (marked by the closed triangles) are not observed in either pattern. The peaks which can be observed in the patterns are accounted for by the alpha-alumina standard, the LSCMV perovskite peaks and the Sc-doped zirconia (labeled 10-ScSZ) fluorite structure peaks. This analysis provides evidence that the sintering aid has formed a solid solution with the majority phase perovskite, and has not reacted with the zirconia during sintering.

While the preferred embodiments of this disclosure have been described, it will be appreciated that various modifications may be made to the sintering aids, lanthanide ceramics, and methods of densifying lanthanide chromite ceramic or a mixture containing lanthanide chromite ceramic, without departing from the spirit or scope of the invention.

The invention claimed is:

1. A method selected from:
   a) a method of densifying a lanthanide chromite ceramic, said method comprising:
   mixing the lanthanide chromite ceramic with sintering aids, the sintering aids comprising one or more spinel oxides; and
   sintering the mixture at a sintering temperature from about 1100° C. to about 1500° C.;
   b) a method of densifying a multi-phase conducting ceramic mixture containing a lanthanide chromite ceramic and one or more ionically conducting ceramics said method comprising:
   mixing the lanthanide chromite ceramic, the one or more ionically conducting ceramics, and sintering aids, the sintering aids comprising one or more spinel oxides, and
   sintering the mixture at a sintering temperature from about 1100° C. to about 1500° C.; and
   c) a method of densifying a multi-phase conducting ceramic mixture comprising a lanthanide chromite ceramic and one or more ionically conducting ceramics, said method comprising:
   mixing the lanthanide chromite ceramic and the one or more ionically conducting ceramic with sintering aids, the sintering aids comprising one or more spinel oxides, and
   sintering the mixture at a sintering temperature from about 1100° C. to about 1500° C. in an air atmosphere, wherein the one or more spinel oxides are selected from the group consisting ZnMn$_2$O$_4$, MgMn$_2$O$_4$, MnMn$_2$O$_4$ and CoMn$_2$O$_4$.

2. The method of claim 1 wherein the sintering temperature is between about 1200° C. to about 1450° C.

3. The method of claim 1 wherein the one or more spinel oxides are incorporated into a matrix of the lanthanide chromite and/or the ionically conductive ceramic to enable liquid phase sintering and/or reaction-based sintering, as the one or more spinel oxides form solid solutions with the matrix of lanthanide chromite and/or the ionically conductive ceramic.

4. The method of claim 1 wherein the sintering is performed in an air atmosphere or a reducing atmosphere.

5. The method of claim 1 wherein the lanthanide chromite ceramic is represented by the formula: (Ln$_{1-x}$AE$_x$)$_z$Cr$_{1-y}$B$_y$O$_{3-\delta}$;
   wherein Ln is a lanthanide element or yttrium, AE is one or more alkaline earth elements, B is one or more transition metals, x is a value less than 1, y is a value less than or equal to 0.5, and z is a value from 0.8 to 1.2.

6. The method of claim 5 wherein x is less than or equal to 0.25, Ln is lanthanum, AE is strontium, and B comprises B'$_{y-n}$B''$_n$, wherein B' and B'' are transition metals and n is a value less than 0.5.

7. The method of claim 5 wherein the lanthanide chromite ceramic is represented by the formula (La$_{0.825}$Sr$_{0.175}$)$_{0.95}$Cr$_{0.72}$Mn$_{0.26}$V$_{0.02}$O$_{3-\delta}$.

8. The method of claim 5 wherein the lanthanide chromite is represented by the formula (La$_{0.825}$Sr$_{0.175}$)$_{0.95}$Cr$_{0.74}$Mn$_{0.26}$O$_{3-\delta}$, or by the formula (La$_{0.75}$Sr$_{0.25}$)$_{0.95}$Cr$_{0.75}$Mn$_{0.25}$O$_{3-\delta}$, or by the formula (La$_{0.75}$Sr$_{0.25}$)$_{0.95}$Cr$_{0.60}$Mn$_{0.40}$O$_{3-\delta}$.

9. A product produced by the method of claim 1.

10. The product of claim 9 wherein the product comprises an interconnector for a solid oxide fuel cell (SOFC), a mixed conducting separation layer for an electrochemical membrane system, a catalyst or other component for use in combustion reactions for hydrocarbons and methane reforming, or a component of an electrochemical sensor.

11. A composition selected from:
   a) a dense lanthanide chromite ceramic composition comprising:
   a lanthanide chromite ceramic represented by the formula (Ln$_{1-x}$AE$_x$)$_z$Cr$_{1-y}$B$_y$O$_{3-\delta}$, wherein Ln is a lanthanide element or yttrium, AE is one or more alkaline earth elements, B is one or more transition metals, x is a value less than 1, y is a value less than or equal to 0.5, and z is a value from 0.8 to 1.2; and
   a sintering aid comprising one or more spinel oxides selected from the group consisting ZnMn$_2$O$_4$, MgMn$_2$O$_4$ MnMn$_2$O$_4$ and CoMn$_2$O$_4$, and wherein the density of the ceramic composition is enhanced by sintering the composition at a sintering temperature from about 1100° C. to about 1500° C.; and
   b) a dense, multi-phase ceramic composition comprising:
   a lanthanide chromite ceramic represented by the formula (Ln$_{1-x}$AE$_x$)$_z$Cr$_{1-y}$B$_y$O$_{3-\delta}$, wherein Ln is a lanthanide element or yttrium, AE is one or more alkaline earth elements, B is one or more transition metals, x is a value less than 1, y is a value less than or equal to 0.5, and z is a value from 0.8 to 1.2;
one or more ionically conducting ceramics; and
a sintering aid comprising one or more spinel oxides, and wherein the density of the ceramic composition is enhanced by sintering the composition at a sintering temperature from about 1100° C. to about 1500° C.

12. The composition of claim 11 wherein the sintering temperature is between about 1200° C. to about 1450° C.

13. The composition of claim 11 wherein the one or more spinel oxides are incorporated into a matrix of the lanthanide chromite and/or the ionically conductive ceramic to enable liquid phase sintering and/or reaction-based sintering, as the one or more spinel oxides form solid solutions with the matrix of lanthanide chromite and/or the ionically conductive ceramic.

14. The composition of claim 11 wherein the sintering is performed in an air atmosphere or a reducing atmosphere.

15. The composition of claim 11 wherein the lanthanide chromite ceramic is represented by the formula: $(Ln_{1-x}AE_x)_z Cr_{1-y}B_yO_{3-\delta}$;
wherein Ln is a lanthanide element or yttrium, AE is one or more alkaline earth elements, B is one or more transition metals, x is a value less than 1, y is a value less than or equal to 0.5, and z is a value from 0.8 to 1.2.

16. The composition of claim 15 wherein x is less than or equal to 0.25, Ln is lanthanum, AE is strontium, and B comprises $B'_{y-n}B''_n$, wherein B' and B'' are transition metals and n is a value less than 0.5.

17. The composition of claim 15 wherein the lanthanide chromite ceramic is represented by the formula $(La_{0.825}Sr_{0.175})_{0.95}Cr_{0.72}Mn_{0.26}V_{0.02}O_{3-\delta}$.

18. The method of claim 15 wherein the lanthanide chromite is represented by the formula $(La_{0.825}Sr_{0.175})_{0.95}Cr_{0.74}Mn_{0.26}O_{3-\delta}$, or by the formula $(La_{0.75}Sr_{0.25})_{0.95}Cr_{0.75}Mn_{0.25}O_{3-\delta}$, or by the formula $(La_{0.75}Sr_{0.25})_{0.95}Cr_{0.60}Mn_{0.40}O_{3-\delta}$.

19. A method selected from:
a) a method of densifying a lanthanide chromite ceramic, said method comprising:
mixing the lanthanide chromite ceramic with sintering aids, the sintering aids comprising one or more spinel oxides; and
sintering the mixture at a sintering temperature from about 1100° C. to about 1500° C.;
b) a method of densifying a multi-phase conducting ceramic mixture containing a lanthanide chromite ceramic and one or more ionically conducting ceramics said method comprising:
mixing the lanthanide chromite ceramic, the one or more ionically conducting ceramics, and sintering aids, the sintering aids comprising one or more spinel oxides, and
sintering the mixture at a sintering temperature from about 1100° C. to about 1500° C.; and
c) a method of densifying a multi-phase conducting ceramic mixture comprising a lanthanide chromite ceramic and one or more ionically conducting ceramics, said method comprising:
mixing the lanthanide chromite ceramic and the one or more ionically conducting ceramic with sintering aids, the sintering aids comprising one or more spinel oxides, and
sintering the mixture at a sintering temperature from about 1100° C. to about 1500° C. in an air atmosphere,
wherein the lanthanide chromite ceramic is represented by the formula $(La_{0.825}Sr_{0.175})_{0.95}Cr_{0.72}Mn_{0.26}V_{0.02}O_{3-\delta}$, or by the formula $(La_{0.825}Sr_{0.175})_{0.95}Cr_{0.74}Mn_{0.26}O_{3-\delta}$, or by the formula $(La_{0.75}Sr_{0.25})_{0.95}Cr_{0.75}Mn_{0.25}O_{3-\delta}$, or by the formula $(La_{0.75}Sr_{0.25})_{0.95}Cr_{0.60}Mn_{0.40}O_{3-\delta}$.

20. The method of claim 19 wherein the one or more spinel oxides are represented by the formula: $AB_2O_4$ or $A_2BO_4$, where A and B are cationic materials having an affinity for B-site occupancy in a lanthanide chromite ceramic structure.

21. The method of claim 20 wherein the one or more spinel oxides are selected from the group consisting $ZnMn_2O_4$, $MgMn_2O_4$, $MnMn_2O_4$ and $CoMn_2O_4$.

22. The composition of claim 19 wherein the one or more spinel oxides are incorporated into a matrix of the lanthanide chromite and/or the ionically conductive ceramic to enable liquid phase sintering and/or reaction-based sintering, as the one or more spinel oxides form solid solutions with the matrix of lanthanide chromite and/or the ionically conductive ceramic.

23. A composition selected from:
a) a dense lanthanide chromite ceramic composition comprising:
a lanthanide chromite ceramic represented by the formula $(La_{0.825}Sr_{0.175})_{0.95}Cr_{0.72}Mn_{0.26}V_{0.02}O_{3-\delta}$, or by the formula $(La_{0.825}Sr_{0.175})_{0.95}Cr_{0.74}Mn_{0.26}O_{3-\delta}$, or by the formula $(La_{0.75}Sr_{0.25})_{0.95}Cr_{0.75}Mn_{0.25}O_{3-\delta}$, or by the formula $(La_{0.75}Sr_{0.25})_{0.95}Cr_{0.60}Mn_{0.40}O_{3-\delta}$; and
a sintering aid comprising one or more spinel oxides, and wherein the density of the ceramic composition is enhanced by sintering the composition at a sintering temperature from about 1100° C. to about 1500° C.; and
b) a dense, multi-phase ceramic composition comprising:
a lanthanide chromite ceramic represented by the formula $(Ln_{1-x}AE_x)_zCr_{1-y}B_yO_{3-\delta}$, wherein Ln is a lanthanide element or yttrium, AE is one or more alkaline earth elements, B is one or more transition metals, x is a value less than 1, y is a value less than or equal to 0.5, and z is a value from 0.8 to 1.2;
one or more ionically conducting ceramics; and
a sintering aid comprising one or more spinel oxides, and wherein the density of the ceramic composition is enhanced by sintering the composition at a sintering temperature from about 1100° C. to about 1500° C.

24. The composition of claim 23 wherein the one or more spinel oxides are represented by the formula: $AB_2O_4$ or $A_2BO_4$, where A and B are cationic materials having an affinity for B-site occupancy in a lanthanide chromite ceramic structure.

25. The composition of claim 23 wherein the one or more spinel oxides are selected from the group consisting $ZnMn_2O_4$, $MgMn_2O_4$, $MnMn_2O_4$ and $CoMn_2O_4$.

26. The composition of claim 23 wherein the one or more spinel oxides are incorporated into a matrix of the lanthanide chromite and/or the ionically conductive ceramic to enable liquid phase sintering and/or reaction-based sintering, as the one or more spinel oxides form solid solutions with the matrix of lanthanide chromite and/or the ionically conductive ceramic.

* * * * *